(12) United States Patent
Ohtani

(10) Patent No.: US 6,791,725 B1
(45) Date of Patent: Sep. 14, 2004

(54) IMAGE FORMING APPARATUS, ITS CONTROLLING METHOD, AND STORAGE MEDIUM

(75) Inventor: Tsuyoshi Ohtani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,182

(22) Filed: Oct. 26, 1999

(30) Foreign Application Priority Data

Oct. 27, 1998 (JP) ............................................. 10-305530

(51) Int. Cl.[7] ................................................. H04N 1/04
(52) U.S. Cl. ...................................... 358/498; 271/114
(58) Field of Search ............................... 358/498, 1.12, 358/1.2, 1.14; 271/114, 288; 399/405

(56) References Cited

U.S. PATENT DOCUMENTS

| 5,223,858 | A |   | 6/1993 | Yokoi et al. ................. 346/134 |
| 5,379,994 | A | * | 1/1995 | Kushida ...................... 271/227 |
| 5,714,990 | A | * | 2/1998 | Courtney ...................... 347/14 |
| 5,890,708 | A | * | 4/1999 | Song ........................ 271/10.03 |
| 6,101,426 | A | * | 8/2000 | Kimura et al. ................. 700/21 |
| 6,240,273 | B1 | * | 5/2001 | Kaisha ........................ 399/405 |

FOREIGN PATENT DOCUMENTS

| JP | 3-138250 | 6/1991 | ............ B65H/7/02 |
| JP | 4-5066 | 1/1992 | ............ B41J/13/00 |
| JP | 08-073062 | 8/1994 | |

* cited by examiner

Primary Examiner—Kimberly Williams
Assistant Examiner—Negussie Worku
(74) Attorney, Agent, or Firm—Fitzpatrick, Cella, Harper & Scinto

(57) ABSTRACT

The present invention provides an image forming apparatus in which the throughput at the time of performing a continuous printing operation can be raised, its controlling method, and a storage medium in which a program to perform the control has been stored. Conveying is controlled on the basis of the length of a set sheet of paper. According to the characteristic control of the present invention, in the state where a rear end of a printed sheet of paper is conveyed to a position over a reference position, a paper feeding operation of a sheet of paper to be subsequently printed is started and, simultaneously, a paper ejecting operation of the printed sheet is performed.

5 Claims, 5 Drawing Sheets

IMAGE FORMING APPARATUS, ITS CONTROLLING METHOD, AND STORAGE MEDIUM

BACKGROUND OF THE INVENTION

1. Field of the Invention

The present invention relates to an image forming apparatus such as a printer for performing print onto a recording medium such as a recording sheet or a film for over head projector (OHP sheet) and, more particularly, to a control of a conveying operation of the recording medium, namely, a paper feeding control.

2. Related Background Art

In a conventional printer, a command is sent to a mechanism control unit in accordance with analysis by a print data analyzing unit, thereby first performing a paper feeding operation. After the paper feeding operation is confirmed, a printing operation is performed by alternately sending a print command and a paper feed command to the mechanism control unit. After the printing operation, a paper ejection command is executed to perform a paper ejecting operation. When the print of the next page is successively executed after the print of one page, the printer waits for the end of the paper ejecting operation and, after that, executes the paper feeding operation for the next page.

In the above paper feeding control, however, since the printer certainly waits for the end of the paper ejecting operation and then performs the paper feeding operation for the next page, when data of a large amount of pages is printed, most of the print operating time is used for time of the paper feeding and ejecting operations, so that there is a problem that the throughput is remarkably deteriorated.

In Japanese Patent Application Laid-Open No. 8-73062, as a technique for improving the throughput of a paper conveying operation, a construction in which the rear end of a sheet is detected by a sensor and a paper feeding of the next sheet is controlled on the basis of the detection result has been disclosed. Specifically speaking, there has been disclosed a construction in which, on the basis of the result obtained by detecting the rear end of the sheet, the printed sheet is conveyed to a position where the next sheet can be fed, the next sheet is fed in this state, and simultaneously, a paper ejecting operation of the previously printed sheet is performed. However, in the construction disclosed in the prior art, it is necessary to detect the rear end of the printed sheet.

SUMMARY OF THE INVENTION

The present invention is made in consideration of the problems. According to the present invention, it is an object to provide an image forming apparatus that is capable of improving the throughput of a continuous printing operation by reducing time needed for paper feeding and ejecting operations, its controlling method, and a storage medium.

In order to accomplish the above object, according to the present invention, there is provided an image forming apparatus comprising: deciding means for deciding whether or not print is continuously performed to the other sheet subsequent to a sheet that is being printed; and controlling means for starting a paper feeding operation of the subsequent sheet during a paper ejecting operation after the print to the sheet which is being printed in the case where it is decided by the deciding means that the print is continuously performed.

According to the image forming apparatus of the present invention, when it is decided by the deciding means that the print is continuously performed, ejecting the sheet is stopped at a desired position in the paper ejecting operation of the sheet which is being printed and, subsequently, the paper ejecting operation is started again and the paper feeding operation of the subsequent sheet is also started.

According to the present invention, there is provided an image forming apparatus for printing while scanning a print head in a main scanning direction, comprising: paper feeding means; position managing means for managing a paper feeding position; storing means for storing the length of a print sheet; detecting means for detecting whether data exists on the next page or not; and controlling means, wherein when it is detected by the detecting means that data exists on the next page, the controlling means decides a position where the sheet for the next page can be fed due to the position managing means and the length of the print sheet stored in the storing means, the paper ejecting operation due to the paper feeding means is temporarily interrupted at the position, and the residual paper ejecting operation is performed simultaneously with the paper feeding operation for the next page.

According to the present invention, there is provided a controlling method of an image forming apparatus comprising: a step of deciding whether or not print for the other sheet is continuously performed subsequent to a sheet that is being printed; and a step of starting a paper feeding operation for the subsequent sheet during a paper ejecting operation after the print of the sheet which is being printed when it is decided in the step that the print is continuously performed.

The invention includes a storage medium in which a program for realizing the controlling method has been stored.

DETAILED DESCRIPTION OF THE PREFERRED EMBODIMENT

An embodiment of the present invention will now be described in detail by using an embodiment of a printer apparatus. The present invention is not limited to the form of an apparatus such as a printer apparatus but it can be similarly embodied in the form of a controlling method of an image forming apparatus and, further, in the form of a storage medium such as a CD-ROM in which a program to realize the controlling method has been stored.

Figure 1:
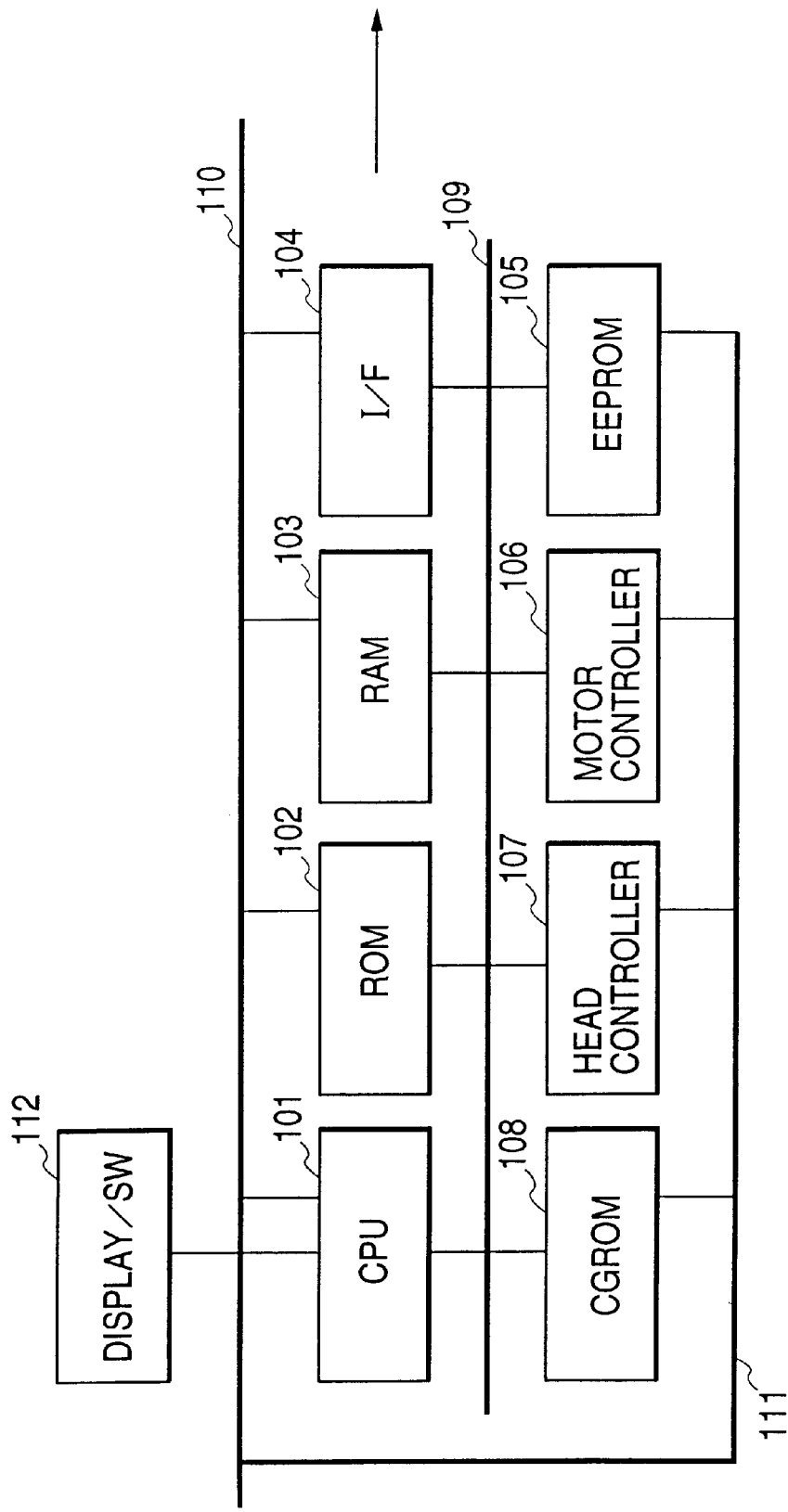
FIG. 1 is a block diagram showing the construction of an embodiment of the present invention.

FIG. 1 is a block diagram showing the construction of a printer apparatus (image forming apparatus) as an embodiment.

In FIG. 1, a CPU 101 is an arithmetic and logic unit for forming print data of the printer apparatus, driving a motor for print control, controlling a discharge in a print head, analyzing a command transferred from an upper apparatus, and performing various setting by inputs from a panel.

In an ROM 102, software for controlling the printer, various data, and font data that is used for print data have been stored. The software for control in the ROM 102 is read out by the CPU 101 and is executed as a program. As various data, there are data that is used as an initial value as it is and data which is developed in an RAM 103, processed by the CPU 101, and then used. For the font data, the font data designated as necessary is read out by the CPU 101, developed in the RAM 103, and formed as print data. For the font data, since the number of mounted font data and the kinds of mounted characters are different in correspondence to the kind of the recording apparatus, the capacity also differs. The printer apparatus of the embodiment has a construction in which one font of a character type "Mincho" has been mounted. In the RAM 103, the result of the above font data modified by a designated modifying method is developed and is used as print data.

In the case of image data as well, image data read by the CPU 101 is similarly developed on a designated printing position in the RAM. 103 and is used as print data. Further, the RAM 103 is also used as a work memory needed to execute the program and a receiving buffer as a temporary storing location of input data from an I/F 104. The I/F 104 is connected to a host apparatus (not shown) and receives data such as print data or a print instructing command.

The I/F 104 of the embodiment is based on an electrical specification based on IEEE-1284 and can perform bi-directional communications in order to receive data from the host apparatus and further transfer the state of the printer to the host apparatus. In an EEPROM 105, setting conditions of the printer have been stored and, in addition, the number of printing sheets, residue of ink, and the like have been also stored. As the setting conditions of the printer, the kind of font, corresponding sheets of paper, and functional items such as automatic power ON/OFF and the like have been stored as information. Since the embodiment relates to the printer for printing by scanning a print head in a main scanning direction, a motor controller 106 is used for printing by scanning the print head once or plural times. The CPU 101 controls the motor controller 106 and the printing (or reading) is performed by using a uniform speed area of a motor. The motor controller 106 also controls as a controller for a line feed motor serving as a motor for moving a sheet in the travelling direction. The motor is operable independently of a motor for head scanning. In the normal printing (or data reading), after the head scanning motor scans once or plural times, the line feed motor controller performs a control to convey the sheet at a predetermined amount. A bus line 109 is a data and address bus for transferring data or an address that is used for memory access. The CPU 101 uses the bus line 109 and controls the units 102 to 107. Reference numeral 111 denotes a power supply line to the units.

Figure 2:
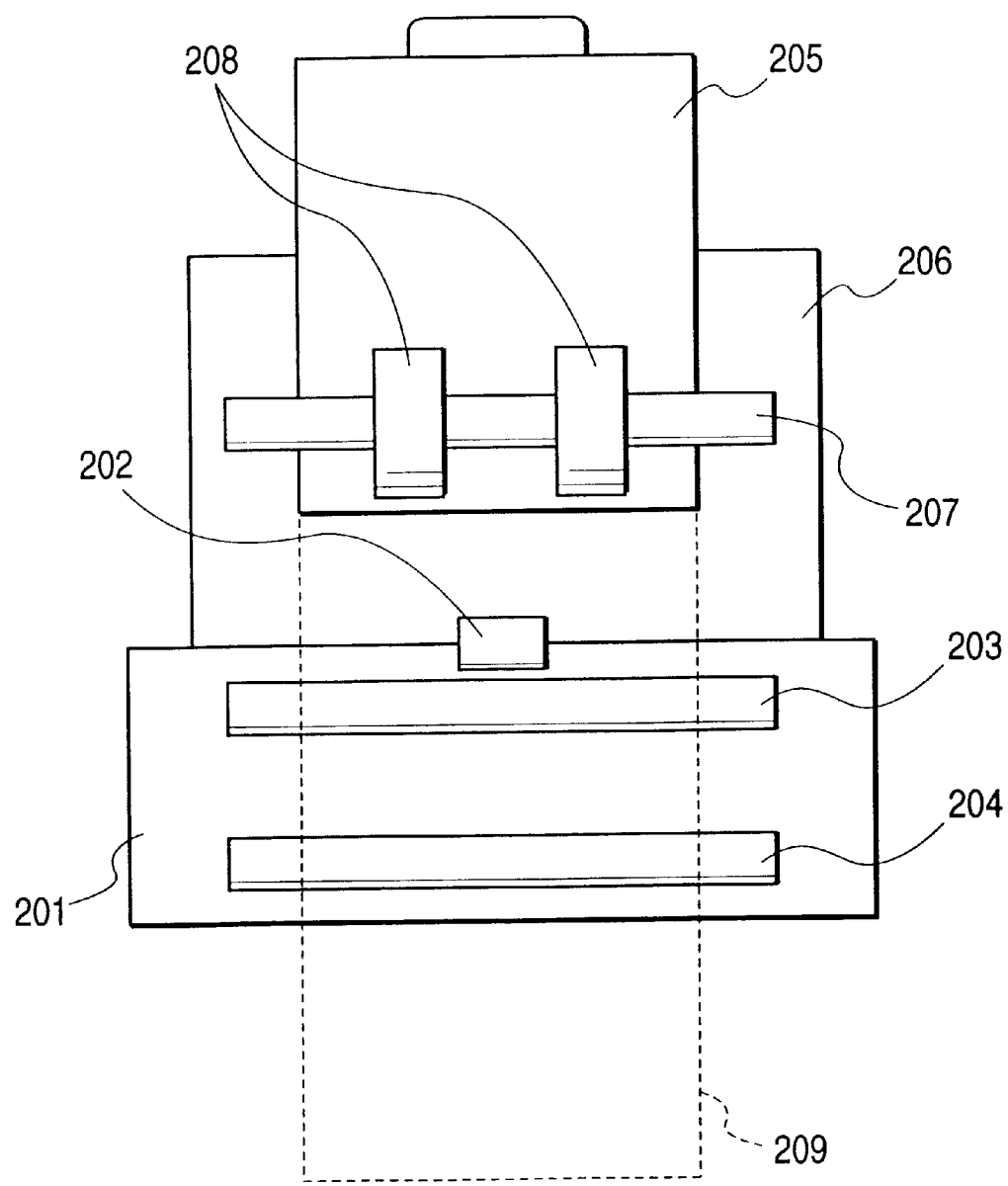
FIG. 2 is a schematic view for explaining a conveying operation of a sheet.

FIG. 2 is a schematic view for explaining the conveying operation of a sheet in the embodiment.

In FIG. 2, reference numeral 201 denotes a printer apparatus main body. The main body 201 comprises at least: a paper position detecting sensor 202; a first print paper conveying roller 203; and a second print paper conveying roller 204 and performs the printing operation while conveying a print sheet 205. Reference numeral 206 denotes an automatic sheet feeder. The feeder comprises a pickup roller rotary shaft 207 and pickup rollers 208. Reference numeral 209 indicates a view showing a paper conveyance path. The print sheet 205 set in the automatic sheet feeder 206 is conveyed to the main body 201 by rotating the shaft 207 at the time of feeding the sheet and is conveyed to the path 209 by the rollers 203, 204.

The apparatus shown in FIG. 2 is a so-called serial system printer for recording while scanning a print head as recording means in the main scanning direction. In FIG. 2, recording means is not shown.

The conveying operation of the sheet according to the present invention will now be described in more detail with reference to the drawings.

Figure 3:
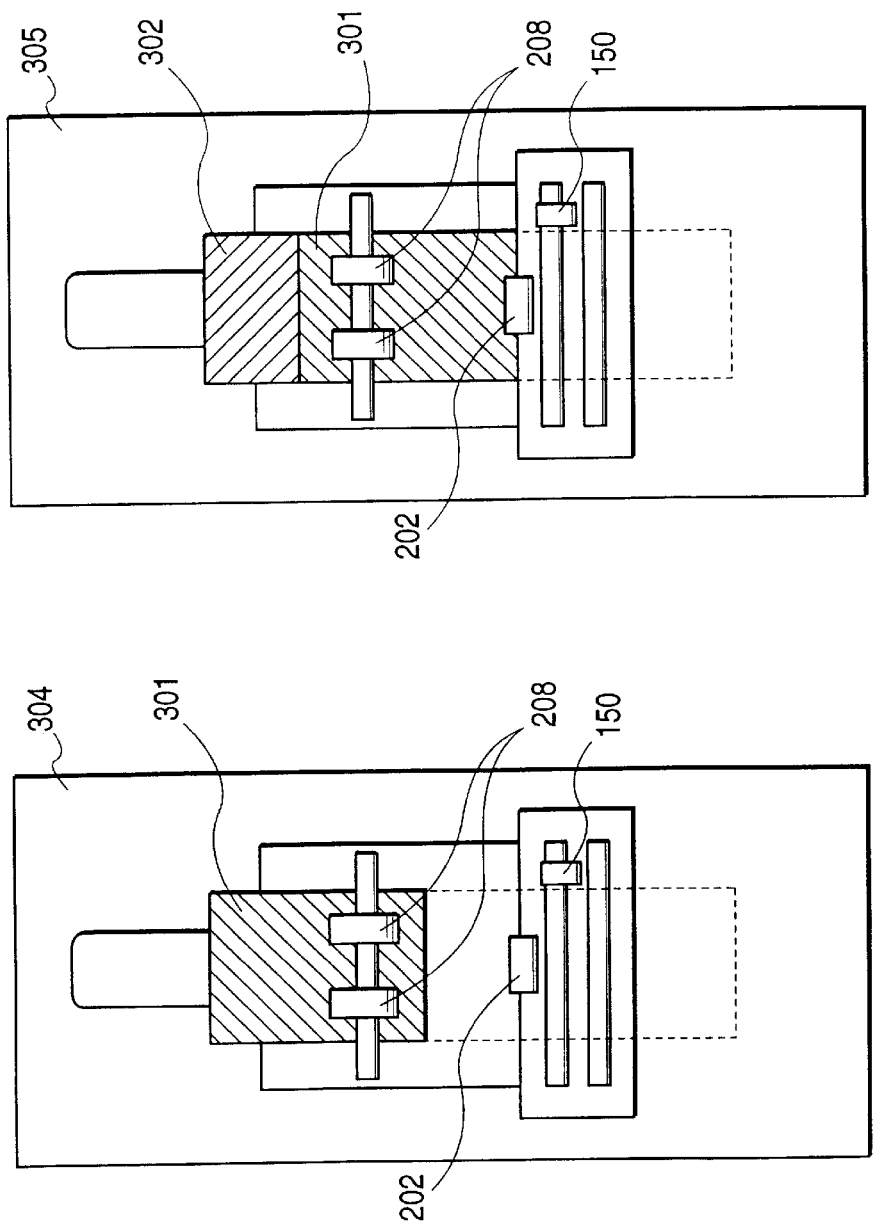
FIG. 3 is a diagram for explaining a paper feeding operation.

FIG. 3 is a diagram showing the state of the printer apparatus before the printing is started. A view shown by reference numeral 304 shows the state before the paper feeding from the automatic sheet feeder is performed. Reference numeral 305 denotes the state where a sheet 301 stacked uppermost on stacked sheets on the automatic sheet feeder is fed to the position of the sensor 202.

Reference numeral 301 denotes the sheet currently located uppermost on the stacked sheets on the automatic sheet feeder. The current page is printed to the sheet 301. Reference numeral 302 indicates a print sheet to which the next page subsequent to the page for the sheet 301 is printed and which is stacked uppermost but one on the stacked sheets on the automatic sheet feeder.

Reference numeral 305 denotes the operation at the time of feeding the sheet and shows the state where the print sheet 301 is conveyed to the position of the position detecting sensor 202 by the pickup rollers 208.

A print head 150 as recording means is scanned in the direction (lateral direction in the diagram) perpendicular to the conveying direction of the sheet and performs the printing operation for the sheet during the scanning. Hereinbelow, the scanning direction of the print head 150 is referred to as a main scanning direction.

Figure 4:
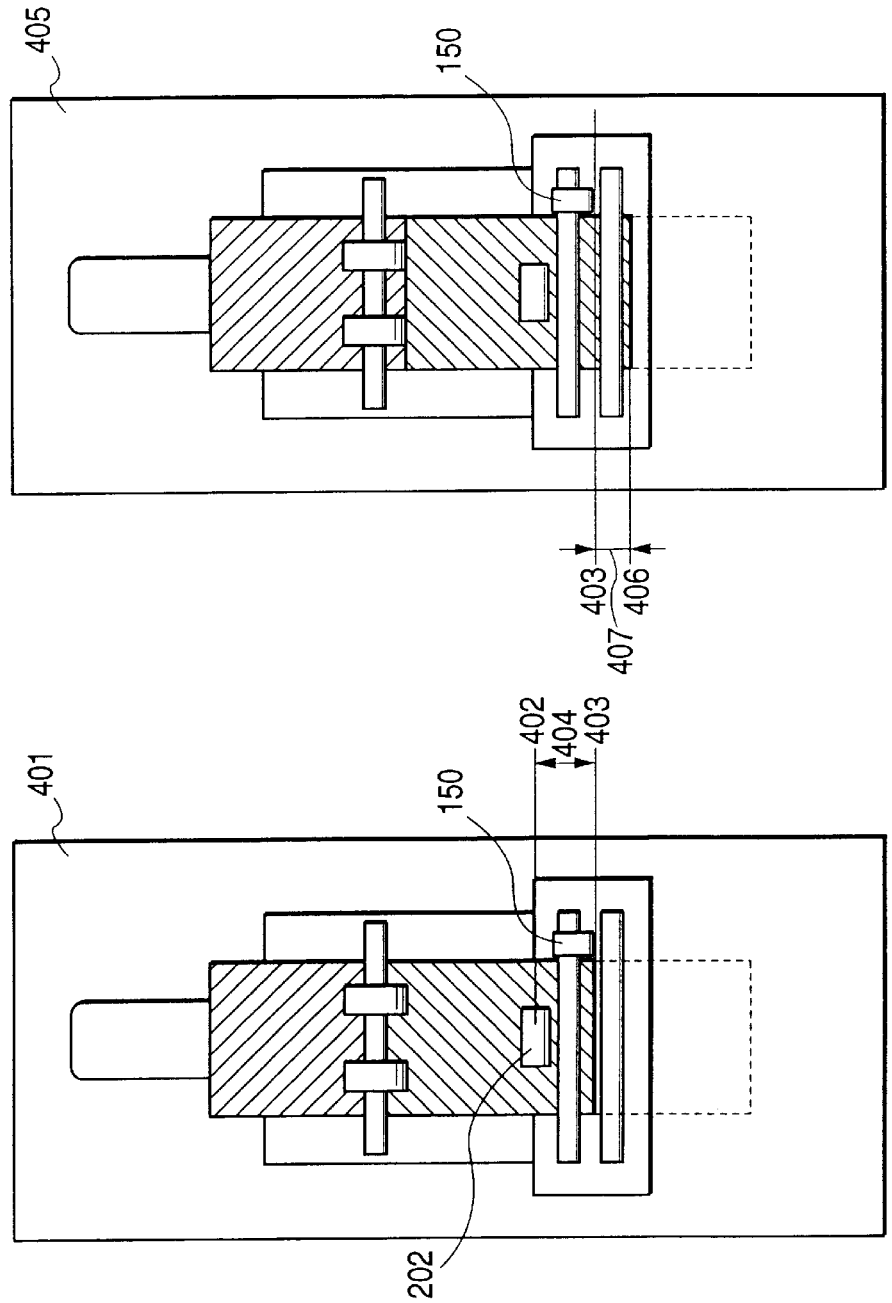
FIG. 4 is a diagram for explaining the paper feeding operation and a line feeding operation.

FIG. 4 is a diagram showing states where the sheet has been further conveyed by the control continued from FIG. 3. Reference numeral 401 in FIG. 4 denotes the state where the print sheet is conveyed to a print starting position. For the state shown by reference numeral 401, the operation is performed by conveying the sheet in the state shown by reference numeral 305 in FIG. 3 at a conveying amount 404 from the print starting position 403 to the position detecting sensor 202.

Reference numeral 405 in FIG. 4 denotes the view showing the state where the print due to one scanning of the print head 150 was finished and the sheet has been conveyed to a printing position 406 due to the next data. The conveying amount of the sheet at that time corresponds to an amount shown by the reference numeral 407.

According to the printer apparatus of the serial system described in the invention, the printing operation by scanning the print head 150 and the conveying operation of sheets are repeated, the printing for one page of the sheet is performed, and a paper ejecting operation for ejecting the sheet is performed. The printing operation and the conveying operation are repeated in the case where subsequent printing data exists.

Figure 5:
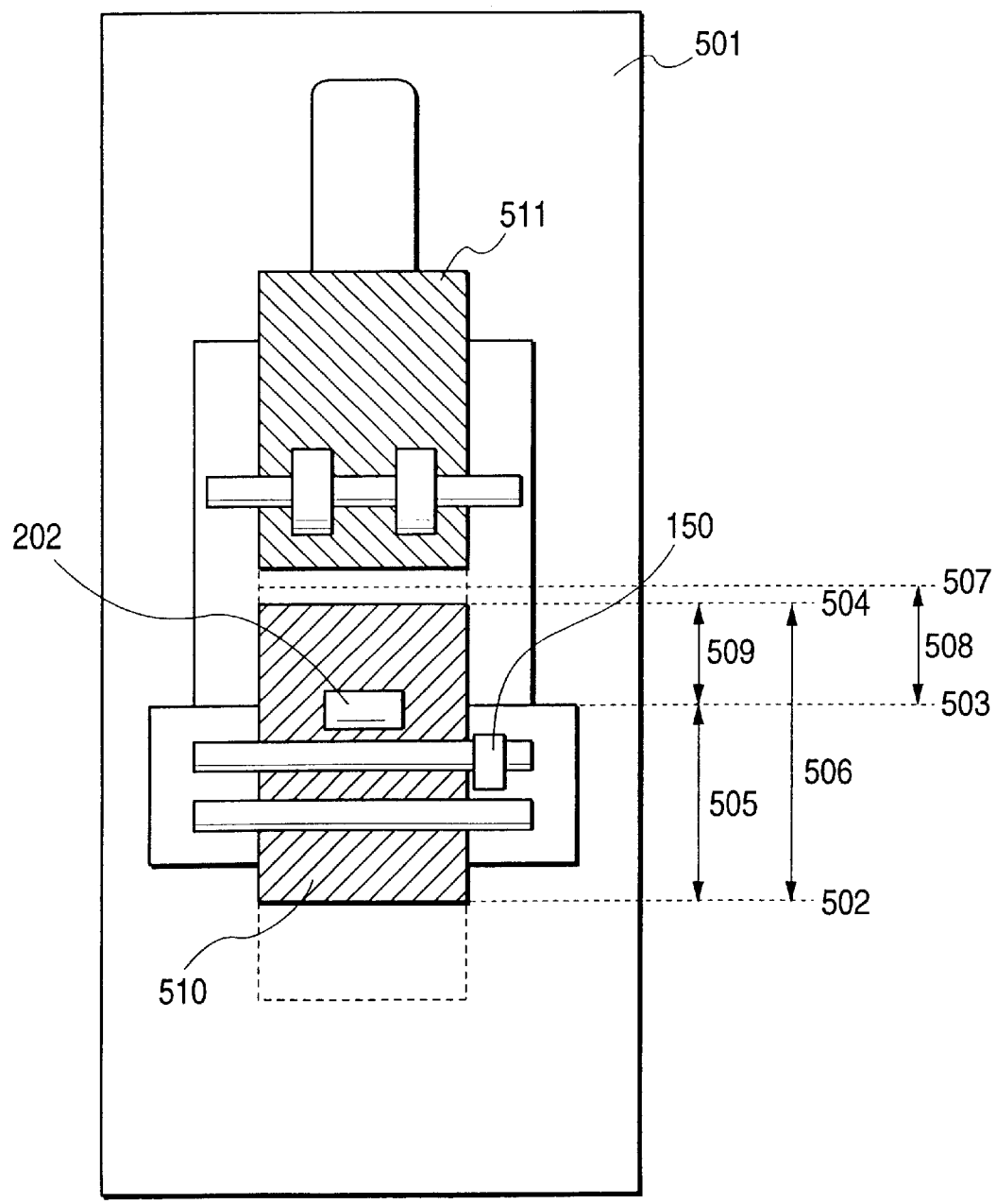
FIG. 5 is a diagram for explaining the paper feeding operation and the line feeding operation.

FIG. 5 is a diagram for explaining the characteristic paper ejecting operation of the present invention.

The printing operation for one page of the sheet is finished and, prior to the paper ejecting operation of the printed sheet, a decision about whether or not print data for the next page exists is made. In the case where it is decided that there is no print data for the next page, the paper ejecting operation for ejecting the printed sheet is performed.

In the case where it is decided that there is print data for the next page, namely, when there is a sheet to be subsequently printed, the paper ejecting operation, which will be described hereinbelow, is performed.

Reference numeral 502 denotes the end of a print sheet 510; 503 a position of the sensor 202 serving as position detecting means; and 504 a rear end of the print sheet 510.

Reference numeral 505 denotes an amount in which the sheet has been conveyed from the position of the position sensor 202 to the present state of the sheet. The amount 505 indicates a value obtained by adding the print starting amount shown by reference numeral 404 in FIG. 4 and the total line feeding amount 407 during the printing. That is, the amount 505 denotes a conveying amount obtained after the front end of the sheet is detected by the sensor 202 and can be known by a driving amount of the motor for conveying the sheet or a rotating amount of each of the rollers for conveying.

Reference numeral 506 indicates the length of the print sheet. The length has a value that has been predetermined before the data is printed and has been stored in the RAM 103. The length 506 can be set in the apparatus by designating the size of the print sheet.

Reference numeral 507 denotes a decision reference position to decide whether or not the sheet for the next page can be fed. That is, when the rear end of the print sheet is conveyed so as to exceed the reference position 507 (when the rear end of the sheet 510 is located below the reference position 507 in the diagram), the print sheet for the next page can be fed.

Reference numeral 508 denotes a distance from the position detecting sensor 202 to the decision reference position 507. The distance has a fixed value. Reference numeral 509 indicates a distance from the position detecting sensor 202 to the rear end 504 of the print sheet 510. The distance is calculated by subtracting the value of the amount 505 from one of the length 506.

When the print for the print sheet 510 is finished and the paper ejecting operation is performed, the distances 508 and 509 are compared. If the distance 509 is larger, the sheet is further conveyed at an amount of (distance 509−distance 508), thereby setting the rear end 504 of the print sheet 510 so as to be located on the same position as the decision reference position 507. That is, when the rear end of the print sheet 510 is located above the reference position 507 (upstream in the conveying direction), the print sheet 510 is conveyed so that a print sheet for the next page can be fed. In this state, since the sheet for the next page can be fed, the paper feeding operation for the next page is performed and, simultaneously, the sheet 510 in which the print has been finished is ejected.

When the distance 508 is larger than that 509, any operation is not performed and the paper ejecting operation is temporarily interrupted in the state as it is. That is, the case where the distance 508 is larger than that 509 denotes a case where the rear end of the print sheet 510 is located below the reference position 507 (downstream in the conveying direction). In this state, the paper feeding for the next page can be performed. Since the paper feeding for the next page can be performed in this state, the paper feeding operation for the next page is performed and, simultaneously, the sheet 510 in which the print has been finished is ejected.

As mentioned above, after the print based on, the print data corresponding to the predetermined page is performed, a decision about whether or not print data of the next page exists is made. When there is print data for the next page, the paper feeding operation for the next page is executed simultaneously with the paper ejecting operation of the printed sheet. In the case where there is print data for the next page, a decision about whether the rear end of the print sheet 510 is located below the reference position 507 is made. The paper ejecting operation and the paper feeding operation can be simultaneously executed in the state where the sheet 510 is conveyed to the position when the sheet for the next page can be fed by controlling on the basis of the decision result.

As described above, according to the present invention, the paper feeding operation for the next page can be performed before the paper ejecting operation of the printed sheet is completely finished, so that the throughput in the case where the printing operation for a plurality of pages is successively performed can be improved.

Needless to say, the object of the invention is also accomplished in such a manner that a storage medium in which program codes of software to realize the functions of the above-mentioned embodiment have been recorded is supplied to a system or an apparatus and a computer (or CPU or MPU) of the system or apparatus reads out and executes the program codes stored in the storage medium.

In this case, the program codes themselves read out from the storage medium realize the functions of the foregoing embodiment and the storage medium in which the program codes have been stored constructs the present invention.

As a storage medium for supplying the program codes, for example, a floppy disk, a hard disk, an optical disk, a magnetooptical disk, a CD-ROM, a CD-R, a magnetic tape, a non-volatile memory card, and an ROM can be used. It is a matter of course that the invention also includes the case where executing the program codes read out by the computer does not merely realize the functions of the above embodiment but, in addition, an OS (operating system) which runs on the computer executes a part or the whole of actual process on the basis of the instruction of the program codes, so that the functions of the above embodiment are realized by the process.

Further, it is a matter of course that the invention also includes the case where the program codes read out from the storage medium are written into a memory provided for a function expansion board inserted to the computer or a function expansion unit connected to the computer and, after that, the CPU or the like provided for the function expansion board or function expansion unit executes a part or the whole of actual process on the basis of the instruction of the program codes, so that the functions of the foregoing embodiment are realized by the process.

The present invention is not limited to the above-mentioned embodiment but it will be obvious to those skilled in the art that many modifications and variations are possible.

What is claimed is:

1. An image forming apparatus for forming an image on a recording medium by using recording means, comprising:

deciding means for, after an image formation for a predetermined recording medium is performed and prior to an operation to eject the predetermined recording medium, deciding whether or not an image formation for a subsequent recording medium is to be performed; and control means for simultaneously performing an ejection of the predetermined recording medium for which an image has been formed and a feeding of the subsequent recording medium, when it is decided by said deciding means that the image formation for the subsequent recording medium is to be performed, wherein said control means controls the ejection and the feeding to produce a time period during which the feeding is performed at a same time as the ejection, and wherein said control means is adapted to determine a position of the predetermined recording medium in accordance with the length of the predetermined recording medium and a conveyed amount of the predetermined recording medium, and controls a start of the feeding of the subsequent recording medium.

2. The apparatus according to claim 1, wherein, when it is decided by said deciding means that the image formation for the subsequent recording medium is to be performed, in the ejection of the predetermined recording medium for which the image has been formed, said control means starts the ejection of the predetermined recording medium and the feeding operation of the subsequent recording medium in a state in which the recording medium is conveyed to a predetermined position.

3. An image forming apparatus that includes scanning means for scanning recording means in a main scanning direction, conveying means for conveying a recording medium, and feeding means for feeding the recording medium, and that forms an image on the recording medium based on data while the scanning means scans the recording means, said image forming apparatus comprising:

position managing means for managing a conveying position of the recording medium by the conveying means;

storing means for storing a length of the recording medium in a conveying direction;

deciding means for deciding whether or not data corresponding to a recording medium for a next page exists; and control means for, in a case in which a decision by said deciding means is made after an image formation for a predetermined recording medium is performed and prior to an ejection of the predetermined recording medium and it is decided that there is data corresponding to a recording medium for the next page, controlling the conveying means to start a conveyance of the recording medium for the next page before completion of the ejection of the predetermined recording medium for which the image has been formed, based on the conveying position managed by the position managing means and information stored in said storing means, and subsequently controlling the feeding means to feed the predetermined recording medium for which the image has been formed, wherein said position managing means manages the conveying position of the recording medium in accordance with a result of detection by a recording medium detecting means, and manages a distance from a rear end of the recording medium to a predetermined position based on a result of subtraction of a conveyed amount of the recording medium since the detection of the recordings medium by the recording medium detecting means from a length of the recording medium in a conveying direction.

4. A controlling method for an image forming apparatus that comprises scanning means for scanning recording means in a main scanning direction, conveying means for conveying a recording medium, and feeding means for feeding the recording medium, and that forms an image on the recording medium based on data while the scanning means scans the recording means, said method comprising:

a decision step, of deciding whether or not an image formation for a subsequent recording medium is to be performed prior to an ejection of a predetermined recording medium in which an image has been formed; and a conveyance step of conveying the predetermined recording medium in which the image has been formed to a position where the subsequent recording medium can may be fed, when it is decided in said decision step that the image formation for the subsequent recording medium is to be performed, and subsequently simultaneously performing ejection of the predetermined recording medium in which the image has been formed and a feeding operation of the subsequent recording medium, wherein an operation to convey the predetermined recording medium in which the image has been formed to the position where the subsequent recording medium can be fed is performed based on a stored recording-medium length in a conveying direction.

5. A storage medium storing a program for executing the controlling method of the image forming apparatus according to claim 4.

* * * * *

UNITED STATES PATENT AND TRADEMARK OFFICE
CERTIFICATE OF CORRECTION

PATENT NO. : 6,791,725 B1
DATED : September 14, 2004
INVENTOR(S) : Tsuyoshi Ohtani It is certified that error appears in the above-identified patent and that said Letters Patent is hereby corrected as shown below:

Title page,
Item [56], References Cited, FOREIGN PATENT DOCUMENTS,
"JP   08-073062   8/1994" should read -- JP   08-073062   3/1996 --.

Column 2,
Line 67, "setting" should read -- settings --.

Column 3,
Line 4, "are" should read -- is --; and
Line 19, "RAM. 103" should read -- RAM 103 --.

Column 5,
Line 51, "that 509" should read -- that of 509 --; and
Line 60, "on," should read -- on --.

Column 6,
Line 37, "to" should read -- into --.

Column 7,
Line 14, "operation" should be deleted.

Column 8,
Line 9, "recordings" should read -- recording --;
Line 24, "step" should read -- step, --;
Line 27, "can may" should read -- can --; and
Line 38, "recording-medium" should read -- recording medium --.

Signed and Sealed this

Fourth Day of January, 2005

JON W. DUDAS
*Director of the United States Patent and Trademark Office*